July 4, 1933.   L. A. DREYFUS   1,916,462
COMMUTATING ELECTRIC MACHINE
Filed Jan. 25, 1929   3 Sheets-Sheet 1
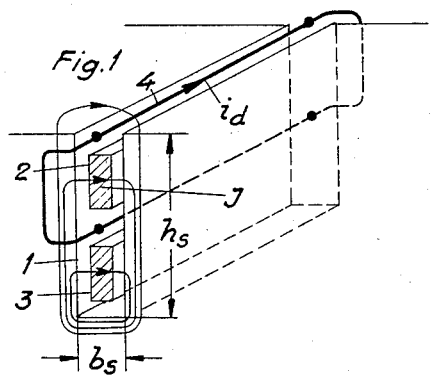
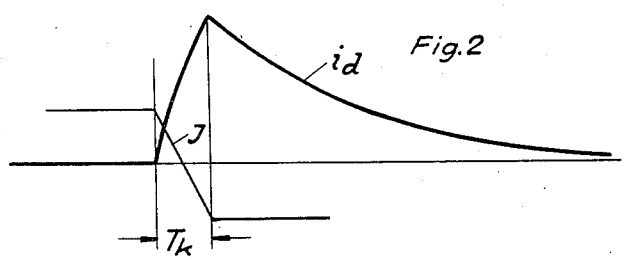
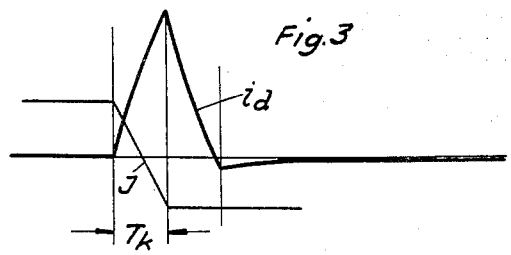
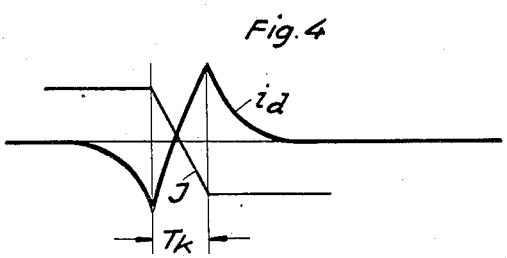
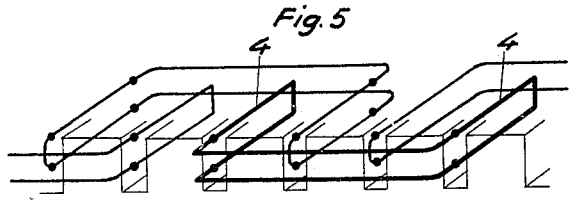
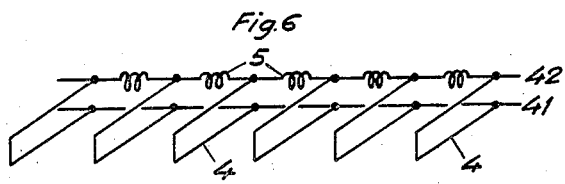
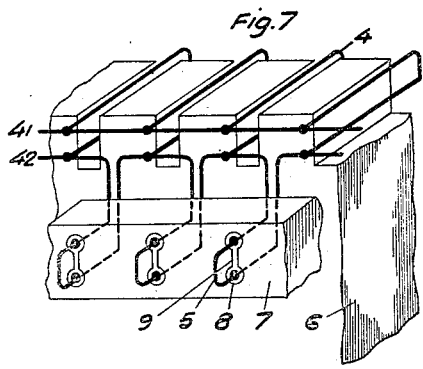
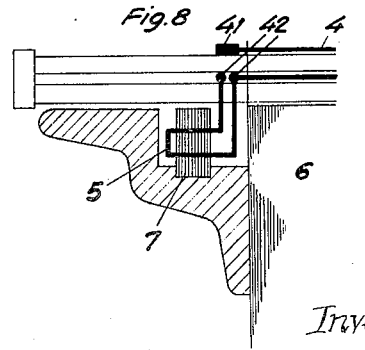
Inventor
Ludvig Arthur Dreyfus.
per Wm Wallace White
Attorney July 4, 1933.   L. A. DREYFUS   1,916,462
COMMUTATING ELECTRIC MACHINE
Filed Jan. 25, 1929   3 Sheets-Sheet 2
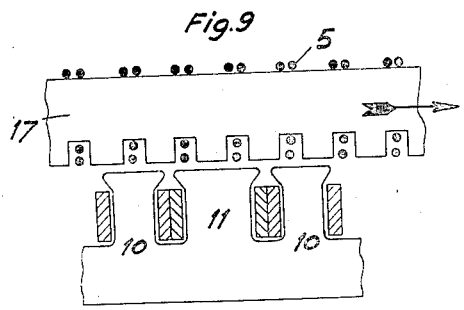
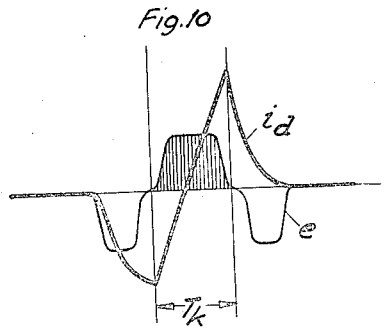
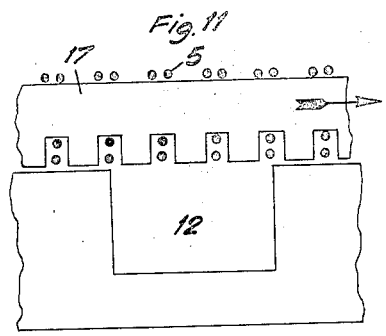
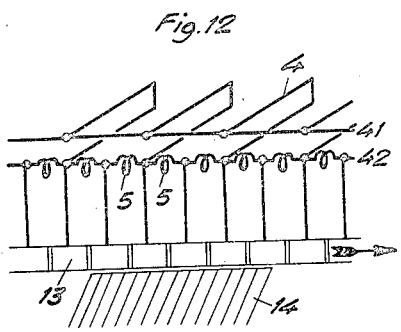
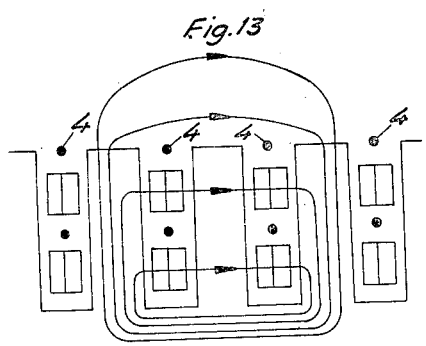
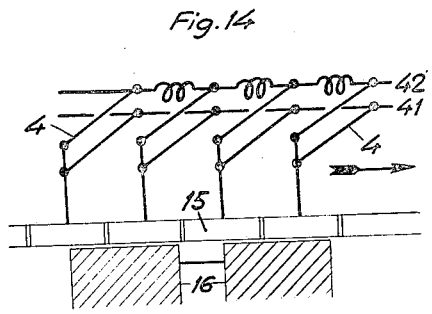
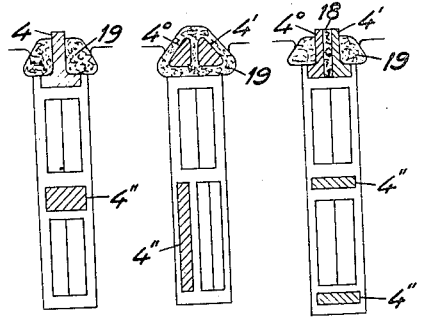
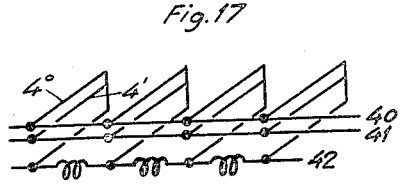
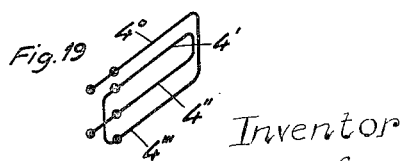
Inventor
Ludvig Arthur Dreyfus.
per Wm Wallace White
Attorney.

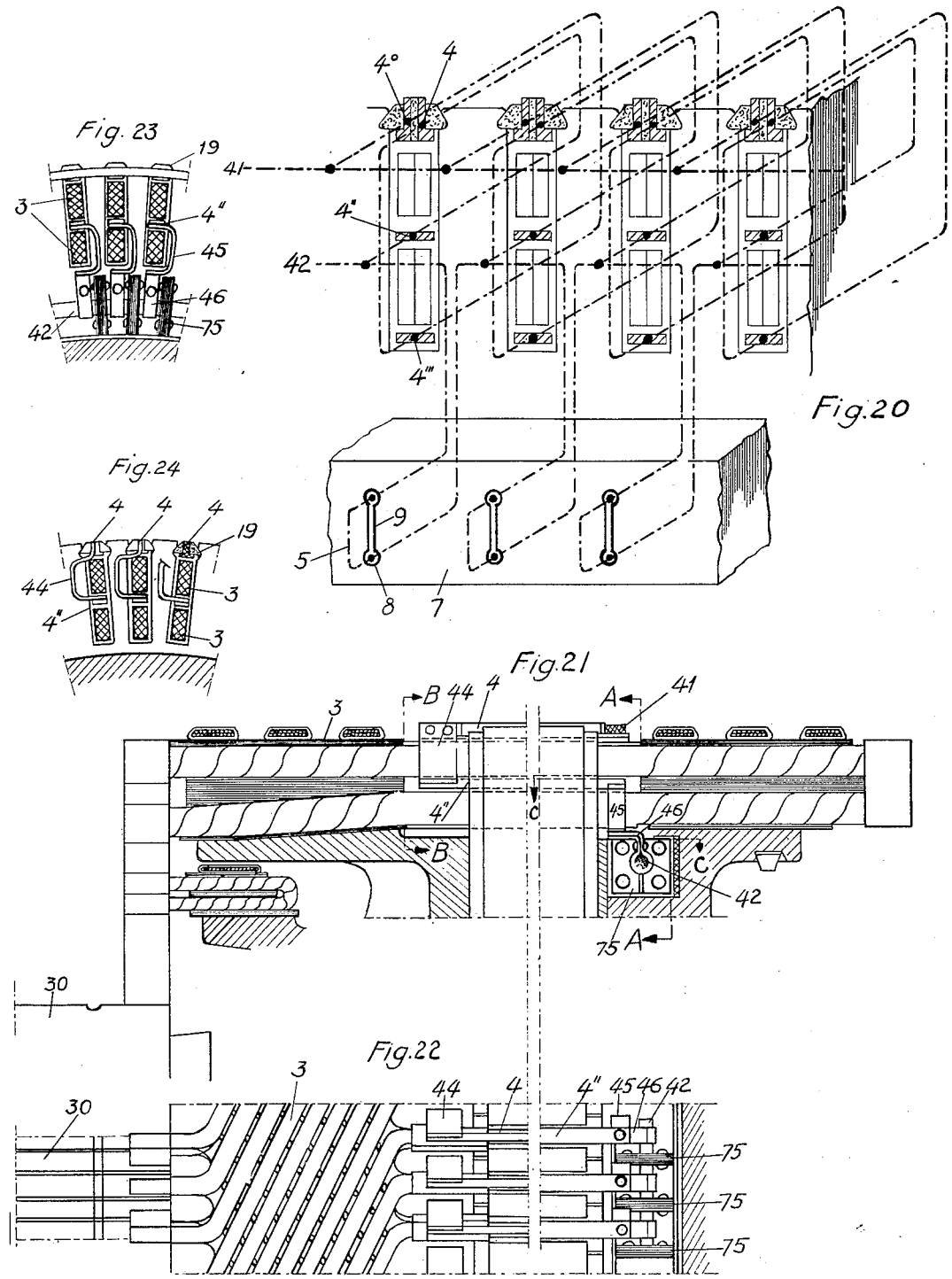

Patented July 4, 1933

1,916,462

UNITED STATES PATENT OFFICE

LUDVIG ARTHUR DREYFUS, OF VASTERAS, SWEDEN, ASSIGNOR TO ALLMÄNNA SVENSKA ELEKTRISKA AKTIEBOLAGET, OF VASTERAS, SWEDEN, A CORPORATION OF SWEDEN

COMMUTATING ELECTRIC MACHINE

Application filed January 25, 1929, Serial No. 334,968, and in Sweden January 27, 1928.

It is a well-known fact, that the commutation of the current in a short-circuited coil of an electric machine produces a reactance voltage therein, said voltage being proportional to the leakage flux embraced by the coil. For counteracting this voltage it is usual to produce in the coil a voltage of rotation by causing it to move in a particular commutating field. In practice it is, however, never possible to cause the instantaneous values of the reactance voltage and the rotational voltage to coincide, but residual voltages have always existed which have caused a bad commutation as soon as the reactance voltage has exceeded a certain voltage limit. Hereby a practical upper limit has been set for the power of commutating machines, as the reactance voltage rises with the size of the machine if no extra steps are taken for reducing it.

A measure for reducing the reactance voltage arising from the commutation which has been tentatively proposed is to place adjacent to the armature winding a damper winding in which currents are induced during the course of commutation so as to counteract the reactance voltage. Earlier attempts in this direction have, however, not led to practicable constructions. The cause hereof has been that the currents induced in the damper windings give rise to ohmic losses which in large machines exceed several times the normal losses in the corresponding portions of the armature windings. Hereby not only the efficiency of the machine is reduced to a non-permissible value, but of course also the heating is increased to a degree which makes such a machine practically useless.

In the accompanying drawings, Fig. 1 diagrammatically shows an armature slot with two winding conductors and one closed loop of a known kind embedded therein. Fig. 2 shows a time diagram of currents corresponding to Fig. 1.

Figs. 3 and 4 show corresponding time diagrams for arrangements according to the present invention. Figs. 5–7 show three different forms of the invention in perspective views, and Fig. 8 an axial section corresponding to Fig. 7. Fig. 9 shows a rectified portion of the armature, embodying one modification of the invention. Fig. 10 shows a current and flux diagram corresponding to Fig. 9. Fig. 11 shows a rectified portion of the armature, embodying another modification of the invention. Fig. 12 shows still a modification in a perspective view. Fig. 13 shows a flux diagram. Fig. 14 shows a perspective view of one modification of the invention. Figs. 15, 16 and 18 show different forms of the invention in transverse sections, and Figs. 17 and 19 corresponding perspective views.

Fig. 20 shows diagrammatically how Figs. 7, 18 and 19 may be combined into one figure. Fig. 21 shows a portion of an armature in an axial section, illustrating the ordinary winding together with conductors surrounding the upper conductor of each slot. Fig. 22 is a view from outside corresponding to Fig. 21 with certain parts in section on the line C—C, Fig. 21. Figs. 23 and 24 show sections on the lines 2—A and B—B respectively in Fig. 21 looking in the direction of the arrows.

The aforesaid inconveniences are particularly prominent for a damper winding of the type having a closed loop directly surrounding the winding portion of a slot. Such an arrangement is diagrammatically illustrated in Fig. 1 of the accompanying drawings, while Fig. 2 shows the variation of the current therein. Referring to Fig. 1, the slot 1 contains two conductors 2, 3, the upper one of which is embraced by a closed loop 4. Hereby the smallest possible leakage is obtained between the loop and the current volume enclosed within the slot, as about ¾ of the slot leakage flux traverses the loop. During the period of commutation proper $T_k$, when the current I in the main winding of the slot is reversed, there is induced in the loop 4, if the commutation is rectilinear, a constant E. M. F.

$$e_d = M \frac{2I}{T_k} \quad (1),$$

in which formula M is the coefficient of mutual induction between the commutated coil and the damper loop. The current $i_d$ hereby induced in the loop rises rapidly from zero according to the well-known formula $$i_d = \frac{e_d}{R_d}\left(1 - e^{-\frac{R_d}{L_d}t}\right),$$

in which $R_d$ and $L_d$ are the ohmic resistance and self-inductance of the loop, respectively, $e$ the base of the natural logarithms, and $t$ time. By the insertion of the value of $e_d$ from Formula 1 and a slight transformation I obtain $$i_d = 2I\frac{M}{L_d} \cdot \frac{1 - e^{-\frac{R_d}{L_d}t}}{\frac{R_d}{L_d}T_k} \quad (2).$$

This current as a function of time is illustrated by the ascending branch of the curve $i_d$ in Fig. 2. The damping action of this current on the reactance voltage in the coil under commutation is proportional to the time derivative of the current. As this damping action is particularly needed towards the end of the commutation period, when the danger of sparking occurs, it is desirable that the portion of said curve $i_d$ lying within the commutation period is as nearly straight as possible, that is, that the time constant $$T_d = \frac{L_d}{R_d}$$

is great in comparison to the time $T_k$.

When the commutation is ended, the current $i_d$ in the closed loop must be damped down to zero by the ohmic resistance of the loop. Since no external E. M. F's are acting, this occurs according to the formula $$i_d = \left(2I\frac{M}{L_d} \cdot \frac{1 - e^{-\frac{T_k}{T_d}}}{\frac{T_k}{T_d}}\right) e^{-\frac{t}{T_d}} \quad (3),$$

where the expression in brackets is the value of $i_d$ at the end of the commutation period, derived from Formula (2). Since $T_d$ is large in comparison with $T_k$, it is readily found, that the time necessary for the current to sink to a value of no importance is several times larger than $T_k$, and during the whole of this time a heat quantity is developed in the loop which is of the same or larger order of magnitude than that developed in the main winding.

An exact expression for the heat quantity produced in the loop is in fact comparatively easy to find, as it must be equivalent to the total quantity of electro-magnetic energy introduced into the loop during the period of commutation. Since the voltage $e_d$ is constant, this energy quantity $W_d$ is simply equal to $$e_d \int_0^{T_k} i_d dt.$$

After the insertion of $i_d$ from Formula (2) the integration gives $$W_d = 4I^2 \frac{M^2}{L_d} \cdot \frac{\frac{T_k}{T_d} + e^{-\frac{T_k}{T_d}} - 1}{\left(\frac{T_k}{T_d}\right)^2},$$

which for the sake of shortness may be written $$W_d = 2I^2 L_s \frac{M^2}{L_d L_s} \cdot \varphi\left(\frac{T_k}{T_d}\right) \quad (4),$$

where $L_s$ is that portion of the self-inductance of the coil under commutation which is due to the leakage flux in the slot, and $$\varphi\left(\frac{T_k}{T_d}\right) = 2\frac{\frac{T_k}{T_d} + e^{-\frac{T_k}{T_d}} - 1}{\left(\frac{T_k}{T_d}\right)^2} \quad (5),$$

an expression which for $$\frac{T_k}{T_d} = 0$$

becomes equal to unity and for $T_d$ considerably greater than $T_k$ becomes practically equal to $$1 - 0.3\frac{T_k}{T_d},$$

that is not much deviates from unity. Further, $$\frac{M^2}{L_d L_s} \text{ is } = 1 - \sigma, \text{ where } \sigma$$

is the so-called Blondel coefficient of leakage between the damper loop and the slot flux of the coil under commutation, thus a value which is made as nearly unity as possible, in order that the damper loop shall be as useful as possible during the commutation. As a final expression for the heat $W_d$ produced in the damper loop by the current during each period of commutation I may thus put $$W_d = \frac{1}{2}(2I)^2 L_s \eta \quad (6),$$

where $\eta$ is not very far from unity.

To this expression it may be first observed, that neither the self-inductance nor the ohmic resistance of the loop occurs therein, whence it is not possible to exert an appreciable influence on the ohmic losses in the loop by altering these quantities, especially not the ohmic resistance, as long as $T_d$ is kept considerably larger than $T_k$.

In comparing more closely the losses in the damper loops with the losses in the corresponding portions of the armature winding (that is, the slot conductors), it has to be noted, that the current volume of each slot is commutated $2v$ times per second, when $v$ is the frequency of pole changes in the armature. The ohmic losses in each loop therefore will be $$(P_{cu})_d = v \cdot (2I)^2 L_s \eta \qquad (7)$$

The normal ohmic losses in the corresponding portion of the main winding are $$P_{cu} = I^2 \cdot 2 R_s \qquad (8)$$

where $R_s$ is the resistance in a coil side lying in the slot. For comparing these loss figures it is necessary to know the proportion between $2_vL_s$ and $R_s$, although already a superficial knowledge of the constants of large machines (which this invention deals with) says that this proportion is generally rather large in these.

A closer examination confirms this. It is facilitated if in Fig. 1 the winding 2, 3 is assumed to fill the slot entirely and its specific conductivity to be correspondingly reduced. I obtain then $$L_s = \frac{0.4\pi}{b_s} 1_s \cdot \frac{4}{3} h_s \cdot 10^{-8} \text{ henries,}$$

and $$R_s = \frac{1_s}{b_s \frac{h_s}{2} \cdot \lambda f} 10^{-4} \text{ ohms,}$$

where $b_s$, $1_s$ and $h_s$ are the width, length, and depth, of the slot in centimeters, $\lambda$ the specific conductivity of the copper (in absolute units) and $f$ the aforesaid reduction coefficient for the latter (space factor of the slot). By dividing and introducing $2_v$ I obtain $$\frac{2vL_s}{R_s} = 2v \cdot \frac{0.8\pi}{3} \lambda f h_s^2 \cdot 10^{-4},$$

which may be put $$= \frac{0.4\pi}{3} \left( \frac{v}{50} \cdot \frac{\lambda}{50} \cdot f \right) h_s^2 \qquad (9)$$

As $\lambda$ for copper is about 50 and $v$ normally has about this value, $h_s$ for a large D. C. machine is about 5 and $f$ in the neighborhood of 0.6, I obtain $$\frac{2vL_s}{R_s} \approx 6.3$$

that is, that the ohmic losses in the damper winding will be many times larger than in the slot conductors of the main winding and also several times large than the total losses of the main winding.

The value thus derived for the additional losses in the damper winding holds good under the presumption, that each damper loop is closed in itself, so that the current therein is damped only by the ohmic resistance of the loop. For reducing the losses to practically acceptable values without diminishing the favorable influence of the damper winding on the commutation, I arrange, according to my present invention, each damper loop in such manner as to be closed not only around the conductor or conductors undergoing commutation, but closed through conductors which are in different relation to the commutating zone than the loop itself. In these conductors may for instance be induced a counter-voltage which rapidly brings down the current $i_d$ in the loop to zero or at least to a considerably lower value than the maximum one, from which lower value the current then may be spontaneously damped down to zero. The said value may be positive or negative.

Fig. 3 shows the current $i_d$ being brought down to zero and even to a negative value immediately after the commutation has been completed, and then attenuated to zero value by the ohmic resistance. It is also possible to induce in the loop, immediately before the commutation period, a voltage opposite to that induced during the commutation and about half as high as that. In this way, the damper current $i_d$ takes the course shown in Fig. 4, whereby the total losses are brought down to about one fourth of the value obtained according to Fig. 3, and to a few per cent of the value obtained in a loop which only embraces the slot conductors. Another way of shortening the damping-down period for the current in the damper winding is to make its self-inductance variable, so that its value is considerably higher after the period of commutation than during the same.

In Fig. 5, each loop 4 is closed at one end but open at the other end and connected to the corresponding loop in another slot lying three slot pitches from that of the first-named loop. The width of the commutating zone is supposed to correspond to these three pitches, whereby that one of two interconnected loops which first enters the commutating zone obtains the course of current shown in Fig. 3. When the commutation is terminated for the slot corresponding to this loop and begins for the slot containing the other loop, the latter impresses upon the former a voltage oppositely directed to that induced in the loop itself during the period of commutation for the conductors in its proper slot, said voltage rapidly pressing down the current. The current in the other loop will of course, absolutely speaking, be the same, as the loops form part of the same circuit. From the point of view of cooperation of the loop with the conductors of its proper slot, the course of current will be the reverse and displaced by one period of commutation with respect to that shown in Fig. 3.

For obtaining a manner of operation according to Fig. 4 an arrangement symmetrical for all the loops may be chosen, for instance that shown in Fig. 6. Here all the loops 4 are connected at their open ends to rings 41, 42 embracing the whole armature. Each loop is thus closed through all other loops in parallel. As the condition for a current course truly following the curve of Fig. 4 is that the current of a loop is distributed substantially only between the adjacent loops, ohmic or inductive resistances 5 are introduced in one of the rings 42 connecting the ends of the loops. In certain cases it may be advantageous that inductive resistances having a certain mutual inductance are used here. The practical embodiment of the arrangement according to Fig. 6 may preferably be as shown in Figs. 7 and 8. Beyond the end of the main core 6 of the armature is a small annular laminated core 7 having slots 8 traversed by loops 5 inserted between the loops 4. The slots 8 may be united two and two by slits 9, and by suitably dimensioning the width of these slots the self-inductance of the loops may be regulated.

If the auxiliary armature is made with the winding 5 lying on the surface or in open slots according to Fig. 9 or 11, where the core is designated by 17, a larger mutual induction is obtained between the different turns of the loop 5. If the auxiliary armature is further caused to cooperate with special auxiliary poles according to Fig. 9, any desired course of current may be obtained in the loops 4. If for instance the said current $i_d$ shall form the time function shown in Fig. 10, I may arrange on both sides of the commutating zone a pair of poles 10 having the same polarity and, if desired, between these a return pole 11, which however may be omitted. The voltage then varies as the curve $e$ in Fig. 10, with or without the shaded portion, and hereby and in cooperation with the influence of the coil undergoing commutation a current $i_d$ according to Fig. 10 is obtained, said figure representing substantially the same course of current as Fig. 4.

If according to Fig. 11, I arrange suitably adjacent to the auxiliary armature 17 a stationary return path for the flux with recesses 12 opposite the commutating zones, the damping circuit can have variable self-inductance, as previously stated. Another way of providing such a variable self-inductance is to connect the ring 42 uniting the loops 4 and containing the inductances 5 to the segments 13 of an auxiliary commutator (Fig. 12) which is partially short-circuited by a brush 14 at the points corresponding to the commutating zones.

In calculating the influence of the damper winding on the commutation I have hitherto considered only the so-called slot leakage flux proper but not the flux passing through the end surfaces of the teeth. This flux is practically always essentially weaker than the slot leakage flux and has therefore a smaller influence on the commutation, but it may still sometimes be desirable to take steps for reducing also the reactance voltage resulting therefrom. The course of this flux is indicated in Fig. 13, from which it is evident that the flux could be substantially embraced by two circuits, each closed over portions of the damping loops arranged for the slot leakage flux. By temporarily connecting these loops together in a certain manner it is therefore possible to provide special damping circuits also for the leakage fluxes through the end surfaces of the teeth. An arrangement for this purpose is shown in Fig. 14. Here the open ends of the loops 4 are connected together by rings 41, 42 in the manner already shown. The closed ends are connected to segments of an auxiliary commutator 15 on which interconnected brushes 16 are trailing, said brushes thus producing a closed current path around certain teeth during the commutation and thereby damping the leakage flux through the teeth. This arrangement operates entirely independent of the damping arrangement for the slot leakage flux. It may in analogy with the latter be provided with special devices for rapidly annihilating the current in the damping circuits produced.

Figs. 15–19 finally show different forms of the damping loops arranged in the slots in detail. As already mentioned, it is most important that the upper conductor is embraced by a damping loop. The latter should preferably extend radially outwards as far as possible, and its outer portion 41 may therefore, as shown in Fig. 15, have T-section so as to divide the slot wedge 19 in two. Hereby the wedge is also reinforced to a mechanically very resistant construction. The portion 4″ of the loop within the slot may also be made with an elongated cross-section and placed alongside the lower conductors, as shown in Fig. 16, and the outer portion may be divided into two halves 4°, 4′, which for instance may form cores in the slot wedge 19, as in Fig. 16, and may be connected each to one peripheral ring 40, 41, as shown in Fig. 17. Finally, a damping loop may be arranged around the volume of current in the outer portion of the slot (the outer conductor for two conductors per slot) and another around all (or both) slot conductors, as shown in Fig. 18, where the two upper loop portions 4°, 4′ which traverse the slot wedge 19 are separated by a piece of insulation 18. The two loops 4°, 4‴ and 4′, 4″ are then preferably series-connected as shown in Fig. 19.

Referring to Figs. 21–24, the major portion of the armature length (beween the dot-and-dash lines) is omitted. 3 is the ordinary armature winding which is connected to a commutator 30. As in Fig. 15, the loop embraces only the upper one of the two conductors in the slot, and its upper bar 4 forms part of the slot wedge 19. These upper bars are directly connected to the lower bars 4″ of the loop on the commutator side of the armature by copper strips 44, one for each slot. On the opposite side, all the upper bars 4 are connected together by a common wing 41, while the lower bars are connected by strips 45, 46 to a ring 42, which traverses laminated iron shells 75 so as to increase its reactance between the strips (corresponding to the reactances diagrammatically shown in Fig. 6 and others and designated by the numeral 5).

I claim as my invention:

1. In commutating electrical machines, an armature core, armature conductors arranged in slots in said core and connected to a commutator, an additional U-shaped conductor in each slot having its legs parallel to and substantially on either side of certain armature conductors therein, and conductors arranged in other slots of said armature and connected to said U-shaped conductors to form closed circuits.

2. In commutating electrical machines, an armature core, armature conductors arranged in slots in said core and connected to a commutator, an additional U-shaped conductor in each slot having its legs parallel to and substantially on either side of certain armature conductors therein, conductors embedded in a core distant from said U-shaped conductors and connecting their ends to form closed circuits, and means for temporarily inducing a voltage in said distant conductors.

3. In commutating electrical machines, an armature core, armature conductors arranged in slots in said core and connected to a commutator, an additional U-shaped conductor in each slot having its legs parallel to and substantially on either side of certain armature conductors therein, and U-shaped conductors symmetrically arranged to the first-named ones and connected to their ends so as to form closed circuits.

4. In commutating electrical machines, an armature core, armature conductors arranged in slots in said core and connected to a commutator, an additional U-shaped conductor in each slot having its legs parallel to and substantially on either side of certain armature conductors in said slot, and peripheral rings interconnecting the open ends of said U-shaped conductors.

5. In commutating electric machines, armature conductors connected to a commutator, open conducting loops substantially parallel to and embracing certain of said armature conductors, peripheral rings interconnecting the open ends of said loops, and impedances in said rings between said loops.

6. In commutating electric machines, armature conductors connected to a commutator, open conducting loops substantially parallel to and embracing certain of said armature conductors, peripheral rings interconnecting the open ends of said loops, and inductances in said rings between said loops.

7. In commutating electric machines, armature conductors connected to a commutator, open conducting loops substantially parallel to and embracing certain of said armature conductors, peripheral rings interconnecting the open ends of said loops, an auxiliary armature, and auxiliary loops magnetically interlinked with said auxiliary armature inserted in said interconnecting rings.

8. In commutating electric machines, armature conductors connected to a commutator, open conducting loops substantially parallel to and embracing certain of said armature conductors, peripheral rings interconnecting the open ends of said loops, auxiliary loops inserted in said interconnecting rings, an auxiliary armature magnetically interlinked with said auxiliary loops, stationary magnetic core portions, and windings carried thereby adjacent to said auxiliary armature.

9. In commutating electrical machines, an armature core, armature conductors arranged in two layers in slots in said core and connected to a commutator, an additional U-shaped conductor in each slot having its legs parallel to and substantially on either side of the upper conductor layer in said slot, and conductors embedded in said armature distant from said U-shaped conductors and connecting their ends to form closed circuits.

10. In commutating electric machines, an armature having slots, conductors in said slots connected to a commutator, wedges closing said slots, conductors forming parts of said wedges and forming open loops embracing certain of said conductors, and conductors distant from each slot connecting the ends of the loop thereof to form a closed circuit.

11. In commutating electric machines, an armature having slots, conductors in the outer and inner portions of said slots connected to a commutator, a loop embracing the conductors in said outer portion of each slot, a loop embracing said outer and inner portions in series therewith, and conductors distant from each slot in series with said loops to form a closed circuit.

In testimony whereof I have signed my name to this specification.

LUDVIG ARTHUR DREYFUS.